(12) United States Patent
Taniguchi et al.

(10) Patent No.: US 10,596,743 B2
(45) Date of Patent: Mar. 24, 2020

(54) METHOD OF PRODUCING MOLDED ARTICLE HAVING CONDUCTIVE CIRCUIT AND PREFORM HAVING CONDUCTIVE CIRCUIT

(71) Applicant: NISSHA PRINTING CO., LTD., Kyoto (JP)

(72) Inventors: Chuzo Taniguchi, Kyoto (JP); Tetsu Nishikawa, Kyoto (JP); Akihisa Nakamura, Kyoto (JP); Hideyuki Nakagawa, Kyoto (JP); Shuhei Miyashita, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 294 days.

(21) Appl. No.: 15/540,031

(22) PCT Filed: Jun. 30, 2016

(86) PCT No.: PCT/JP2016/069455
§ 371 (c)(1),
(2) Date: Jun. 27, 2017

(87) PCT Pub. No.: WO2017/056608
PCT Pub. Date: Apr. 6, 2017

(65) Prior Publication Data
US 2017/0361519 A1 Dec. 21, 2017

(30) Foreign Application Priority Data
Sep. 28, 2015 (JP) .................................. 2015-189242

(51) Int. Cl.
*B29C 49/02* (2006.01)
*B29C 49/22* (2006.01)
*B29L 31/00* (2006.01)

(52) U.S. Cl.
CPC .............. *B29C 49/02* (2013.01); *B29C 49/22* (2013.01); *B29C 2049/026* (2013.01); *B29K 2995/0005* (2013.01); *B29L 2031/7158* (2013.01)

(58) Field of Classification Search
CPC ....................................................... B29C 49/02
See application file for complete search history.

(56) References Cited

U.S. PATENT DOCUMENTS

| 2002/0135519 A1* | 9/2002 | Luch ................ G06K 19/07779 343/700 MS |
| 2008/0129514 A1* | 6/2008 | Chisholm ......... B29C 45/14065 340/572.8 |
| 2016/0377493 A1* | 12/2016 | Hong ....................... G01B 7/16 73/774 |

FOREIGN PATENT DOCUMENTS

| JP | S5973924 | 4/1984 |
| JP | 2006048016 | 2/2006 |

(Continued)

OTHER PUBLICATIONS

"International Search Report (Form PCT/ISA/210)", dated Aug. 9, 2016, with English translation thereof, pp. 1-4.

*Primary Examiner* — Austin Murata
(74) *Attorney, Agent, or Firm* — JCIPRNET (57) ABSTRACT

[Problem] To provide: a method of producing molded article having conductive circuit, whereby a molded article having a conductive circuit following a three-dimensional curved surface can be easily obtained even using blow molding; and a preform having a conductive circuit, used to obtain said molded article having a conductive circuit. [Solution] This method of producing a molded article having a conductive circuit is configured such that: an ink having stretchability is used and a conductive circuit layer is formed upon a preform; and the preform is blow-molded and a molded (Continued)

article having a conductive circuit is obtained. This preform having a conductive circuit is for obtaining a molded article having a conductive circuit, by using blow molding, and is configured so as to have a conductive circuit layer Ruined upon the preform by using a stretchable ink.

9 Claims, 7 Drawing Sheets

(56) References Cited

FOREIGN PATENT DOCUMENTS

| | | |
|---|---|---|
| JP | 2009048662 | 3/2009 |
| JP | 2010524747 | 7/2010 |
| JP | 2014021824 | 2/2014 |

* cited by examiner

METHOD OF PRODUCING MOLDED ARTICLE HAVING CONDUCTIVE CIRCUIT AND PREFORM HAVING CONDUCTIVE CIRCUIT

CROSS-REFERENCE TO RELATED APPLICATION

This application is a 371 of international application of PCT application serial no. PCT/JP2016/069455, filed on Jun. 30, 2016, which claims the priority benefit of Japan application no. 2015-189242, filed on Sep. 28, 2015. The entirety of each of the abovementioned patent applications is hereby incorporated by reference herein and made a part of this specification.

TECHNICAL FIELD

The present invention relates to a method of producing a molded article having a conductive circuit and a preform having a conductive circuit.

BACKGROUND ART

In recent years, for logistics and inventory management, IC tags configured to transmit and receive data through external readers and writers in a non-contact manner have been attached to packages of products and the like in many cases. Here, the IC tag includes an antenna circuit printed on, for example, a film and an IC chip.

As one aspect thereof, for example, in Patent Literature 1, an IC label obtained by bonding two thermoplastic resin films with an IC tag interposed therebetween and a method of producing a molded article integrated with the IC label are disclosed. The production method includes the following processes: (1) fixing an IC label into a mold, and then pushing a melted parison into the mold from above the mold and clamping the mold, and (2) supplying compressed air into the parison, inflating the parison to bring it into close contact with the mold to form a container shape, fusing it with the IC label, cooling the mold, and opening the mold.

CITATION LIST

Patent Literature

Patent Literature 1

Japanese Unexamined Patent Application No. 2006-048016

SUMMARY OF INVENTION

Technical Problem

However, since IC labels of the related art have no stretchability, there are problems in that a part in which an IC label is provided is limited to a plane or a 2-dimensional curved surface, and it is difficult to provide an IC label to a part of a 3-dimensional curved surface.

The present invention has been made in view of the above circumstances and provides a method of producing a molded article having a conductive circuit through which a molded article having a conductive circuit in which the conductive circuit follows a 3-dimensional curved surface even when blow molding is performed is easily obtained, and a preform having a conductive circuit used for obtaining such a molded article having a conductive circuit.

Solution to Problem

A plurality of aspects for addressing problems will be described below. Such aspects can be arbitrarily combined as necessary.

A method of producing a molded article having a conductive circuit of the present invention includes forming a conductive circuit layer on a preform using an ink having stretchability and blow molding the preform to obtain a molded article having a conductive circuit.

In a preferred aspect, the process of forming a conductive circuit layer on a preform includes a process of forming a transfer layer including a conductive circuit layer formed on a substrate sheet using an ink to obtain a transfer sheet, and a process of disposing the transfer sheet on the preform, applying heat and pressure to the transfer sheet in order to transfer the transfer layer to the preform, and removing the substrate sheet.

In a preferred aspect, the method further includes a process of forming a pattern layer between the substrate sheet and the conductive circuit layer.

In a preferred aspect, the method further includes a process of forming a protective layer between the substrate sheet and the pattern layer.

In a preferred aspect, the process of forming the conductive circuit layer on the preform includes a process of printing the conductive circuit layer onto the preform using the ink.

In a preferred aspect, the method further includes a process of forming a pattern layer on the conductive circuit layer.

In a preferred aspect, the method further includes a process of forming a protective layer on the pattern layer.

In these preferred aspects, the conductive circuit layer is formed in a part in which an extension rate of the preform is 40% or less.

In these preferred aspects, the ink contains any one of silver, PEDOT, carbon black, and a carbon nanotube.

In these preferred aspects, the method further includes a process of installing an electronic component on the preform to be electrically connected to the conductive circuit layer.

In these preferred aspects, the method further includes a process of installing an electronic component on the molded article having a conductive circuit to be electrically connected to the conductive circuit layer.

A preform having a conductive circuit of the present invention is a preform for obtaining a molded article having a conductive circuit by blow molding, wherein a conductive circuit layer is formed on the preform using an ink having stretchability.

In a preferred aspect, a pattern layer is provided on the conductive circuit layer.

In a preferred aspect, a protective layer is provided on the pattern layer.

In these preferred aspects, the ink contains any one of silver, PEDOT, carbon black, and a carbon nanotube.

In these preferred aspects, an electronic component is installed on the preform to be electrically connected to the conductive circuit layer.

Advantageous Effects of Invention

In the method of producing a molded article having a conductive circuit of the present invention, a conductive circuit layer is formed on a preform using an ink having stretchability and the preform is blow-molded to obtain a molded article having a conductive circuit. Therefore, according to the present invention, even when the molded article having a conductive circuit has a 3-dimensional curved surface, it is possible to easily obtain a molded article having a conductive circuit in which the conductive circuit follows the 3-dimensional curved surface.

The preform having a conductive circuit of the present invention is a preform for obtaining a molded article having a conductive circuit by blow molding in which a conductive circuit layer is formed on the preform using an ink having stretchability. Therefore, in the preform having a conductive circuit of the present invention, when the preform having a conductive circuit is blow-molded to produce a molded article having a conductive circuit, even when the molded article having a conductive circuit has a 3-dimensional curved surface, the conductive circuit can follow the 3-dimensional curved surface.

DESCRIPTION OF EMBODIMENTS

A method of producing a molded article having a conductive circuit and a preform having a conductive circuit used for obtaining a molded article having a conductive circuit will be described below with reference to exemplary embodiments.

The method of producing a molded article having a conductive circuit of the present invention includes forming a conductive circuit layer on a preform using an ink having stretchability and blow molding the preform to obtain a molded article having a conductive circuit. Therefore, a molded article having a conductive circuit 7 of the present invention can be produced by the following production method (refer to FIGS. 1(*a*) to 1(*d*)).

Figure 1:
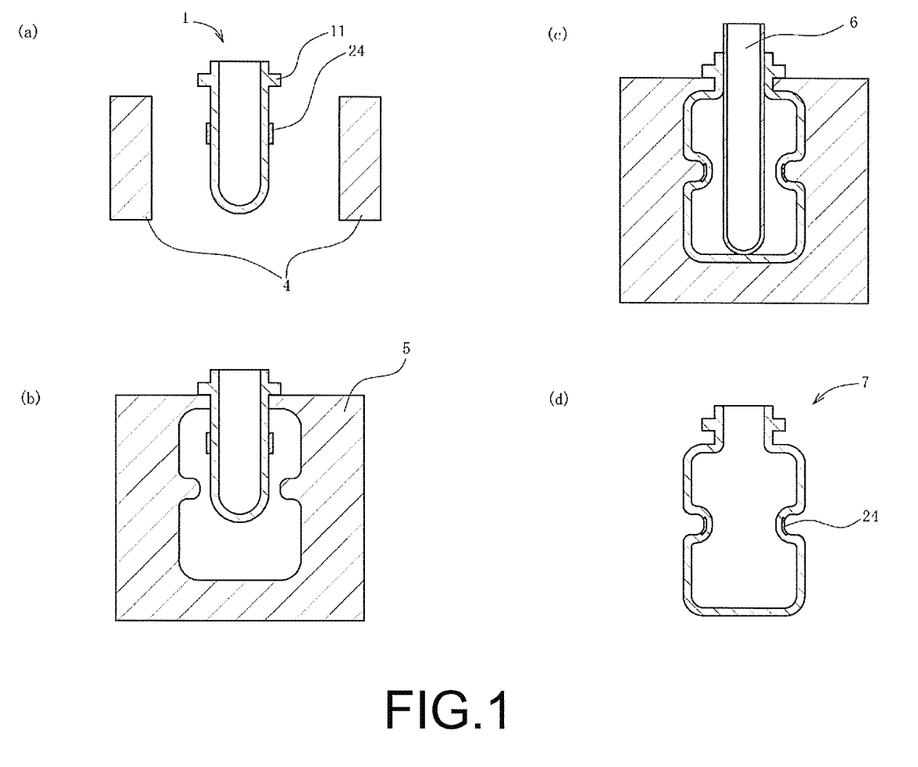
FIG. 1 is a cross-sectional view showing an example of a method of producing a molded article having a conductive circuit of the present invention.

(1) Heating and softening a preform having a conductive circuit 1 in which a conductive circuit layer 24 is formed in a heater 4,
(2) Setting the softened preform having a conductive circuit 1 in a mold 5 and stretching the preform having a conductive circuit 1 in a stretching rod 6, and
(3) Supplying compressed air from the stretching rod 6 into the preform having a conductive circuit 1 to obtain the molded article having a conductive circuit 7.

Figure 2:
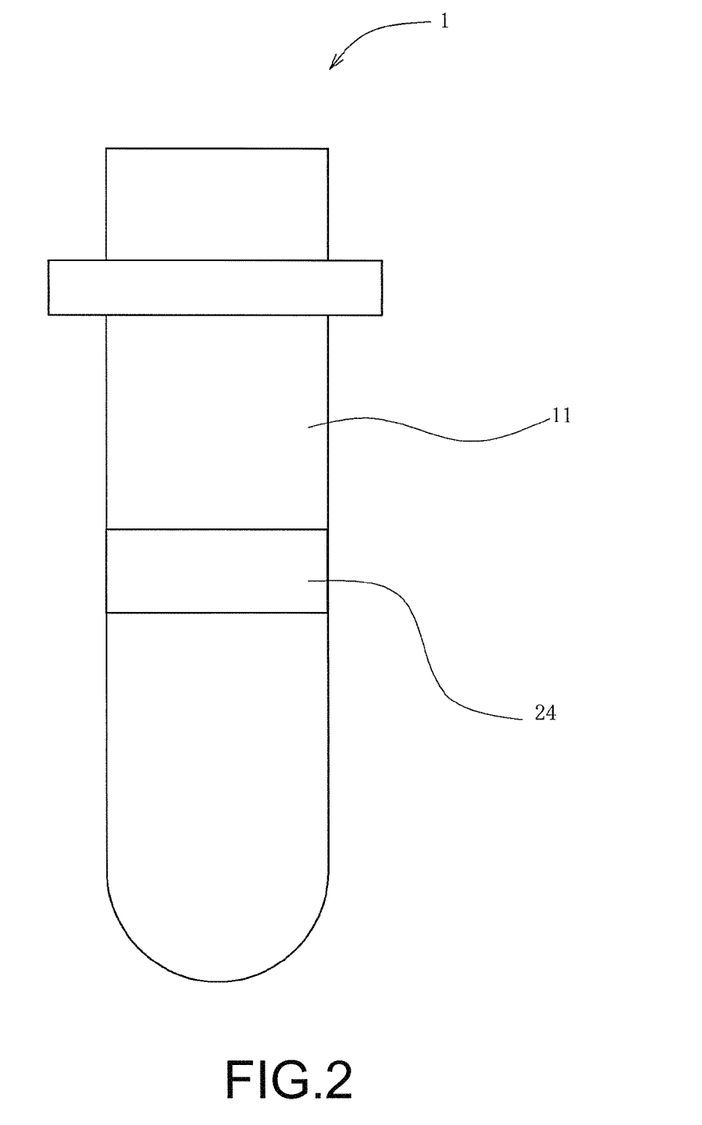
FIG. 2 is a side view of a preform having a conductive circuit according to an embodiment of the present invention.

Here, the preform having a conductive circuit is a preform for obtaining a molded article having a conductive circuit by blow molding, and a conductive circuit layer is formed on the preform using an ink having stretchability (refer to FIG. 2).

A preform 11 is a preformed body used in blow molding and is mainly made of a resin. A material of the preform of the present invention is not particularly limited. For example, polyethylene terephthalate, polyethylene, polyvinyl chloride, polyethylene naphthalate, and polypropylene can be used. A method of producing the preform 11 is not particularly limited. Known methods such as injection molding and press molding can be used.

In the present invention, the ink used for forming the conductive circuit layer 24 includes a material having conductivity and stretchability. As such a material, a material containing any one of silver, poly(3,4-ethylenedioxythiophene) (PEDOT), carbon black, and a carbon nanotube can be used. When PEDOT is used, since PEDOT is poorly soluble in water or a solvent, polystyrene sulfonate (PSS) is preferably added. Such a material is dispersed in an ink as particles. A binder resin is preferably contained in the ink. The particles are dispersed in the ink by the binder resin and the particles are supported on the binder resin. In addition, when the binder resin is included, the ink can be firmly adhered to the coated surface. Here, the ink may contain a curing agent, a solvent, and other additives.

Examples of the binder resin include an epoxy resin, a polyester resin, an acryl resin, a urethane resin, a phenol resin, a polyimide resin, and an elastomer resin. These may be used alone or may be used in a mixture of two or more thereof. A weight ratio between the particles and the binder resin is preferably 20:80 to 99:1, and more preferably 60:40 to 80:20. When the weight proportion of the particles is less than 20, problems such as a decrease in conductivity of the formed conductive circuit layer and an increase in resistance value occur. On the other hand, when the weight proportion of the binder resin is less than 1, since particles are not uniformly dispersed, problems such as a decrease in conductivity and an increase in resistance value occur. In addition, when the preform in which the conductive circuit layer 24 is formed is blow-molded, problems such as disconnection of a circuit and release of a circuit from the preform occur due to lowering of an adhesive force applied to an ink coated surface.

A heating temperature in the heater 4 is preferably set to 50° C. to 150° C., and the temperature of the mold 5 may be adjusted to 100° C. to 250° C. (refer to FIG. 1*a*).

The conductive circuit layer 24 is preferably formed in a part in which an extension rate of the preform 11 is 40% or less when blow molding is performed. When the conductive circuit layer 24 is formed in a part in which an extension rate exceeds 40%, the conductive circuit layer 24 does not follow defothiation due to the blow molding, which causes a problem such as disconnection of a conductive circuit. For example, when a blow molded article is a bottle, a part in which an extension rate of a preform is 40% or less is a part corresponding to a mouth, a bottom, or a neck of the bottle.

In the above molded article having a conductive circuit 7, the conductive circuit layer 24 is formed using an ink having stretchability. Therefore, even when the molded article has a 3-dimensional curved surface, the conductive circuit layer 24 can follow the 3-dimensional curved surface. In addition, since the conductive circuit layer 24 is formed in a part in which an extension rate of the preform having a conductive circuit 1 is 40% or less, the conductive circuit layer 24 is not disconnected even when blow molding is performed.

Here, while the stretching rod 6 is used in the present embodiment, blow molding can be performed simply by supplying compressed air.

Figure 3:
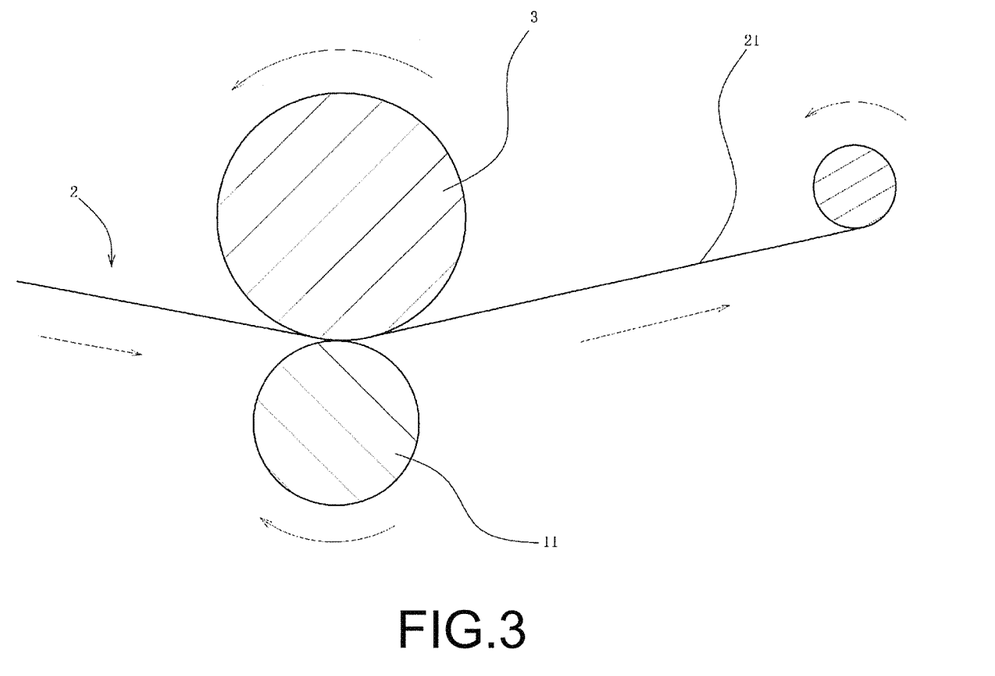
FIG. 3 is a cross-sectional view showing an example of a method of producing a preform having a conductive circuit according to the present invention.
Figure 4:
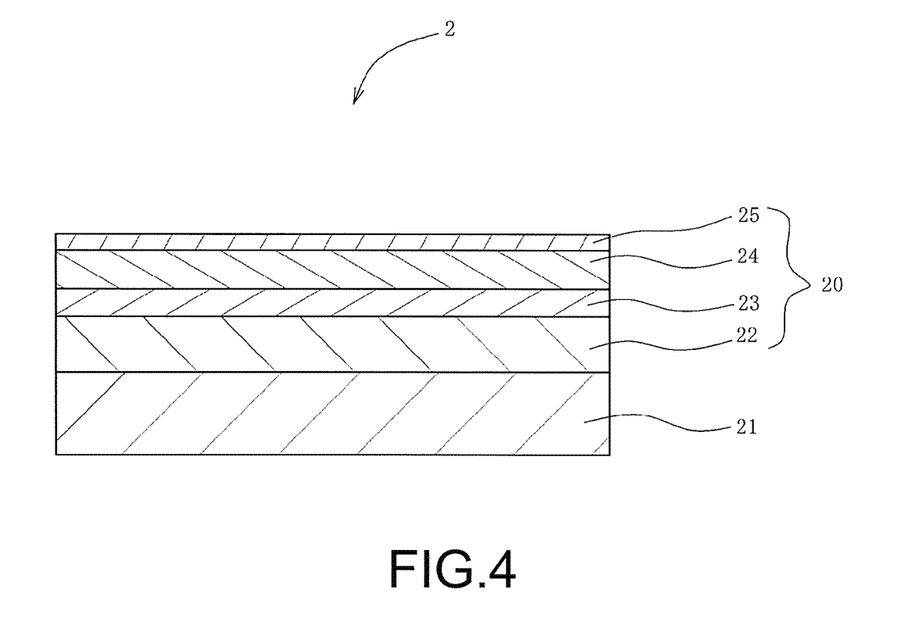
FIG. 4 is a cross-sectional view showing an example of a transfer sheet.

The process of forming the conductive circuit layer 24 on the preform 11 using the above-described ink can include the following processes (refer to FIG. 3 and FIG. 4).

(1) A process of forming a protective layer 22 on a substrate sheet 21, (2) A process of forming a pattern layer 23 on the protective layer 22, (3) A process of forming the conductive circuit layer 24 on the pattern layer 23 using the above-described ink, (4) A process of forming an adhesive layer 25 on the conductive circuit layer 24 to obtain a transfer sheet 2, and (5) A process of disposing the transfer sheet 2 on the preform 11, applying heat and pressure to the transfer sheet 2 to transfer a transfer layer 20 to the preform 11, and removing the substrate sheet 21.

A material of the substrate sheet 21 is not particularly limited. An acrylic resin, an olefin resin, a polyester resin, a vinyl chloride resin, a polycarbonate resin, and a thermoplastic resin such as an ABS resin and a laminate thereof may be exemplified. The thickness of the substrate sheet 21 may be 15 μm to 600 μm. Here, a release layer may be formed on the substrate sheet 21 in order to enhance release properties with respect to the substrate sheet and the protective layer.

The protective layer 22 is a layer serving as the outermost surface of the preform having a conductive circuit after the transfer layer 20 is transferred onto the preform and the substrate sheet 21 is removed. When the protective layer 22 is formed, it is possible to impart water resistance and durability. As a material of the protective layer 22, a copolymer such as a vinyl chloride-vinyl acetate copolymer resin and an ethylene-vinyl acetate copolymer resin may be used in addition to an acrylic resin, a polyester resin, a polyvinyl chloride resin, a cellulose resin, a rubber resin, a polyurethane resin, and a polyvinyl acetate resin. When hardness is required for the protective layer 22, a photocurable resin such as a UV curable resin, a radiation curable resin such as an electron beam curable resin, and a thermosetting resin may be selected and used. As a method of forming the protective layer 22, a common printing method such as a gravure printing method, a screen printing method, and an offset printing method and a coating method such as a gravure coating method and a roll coating method may be used.

The pattern layer 23 may be formed on the entire or part of the protective layer 22. As materials of the pattern layer 23, a resin such as a polyvinyl resin, a polyamide resin, a polyester resin, an acrylic resin, a polyurethane resin, a polyvinyl acetal resin, a polyester urethane resin, a cellulose ester resin, or an alkyd resin may be used as a binder, and a colored ink containing an appropriate color pigment or dye as a coloring agent may be used. As a method of forming the pattern layer 23, a common printing method such as a gravure printing method, a screen printing method, and an offset printing method and a coating method such as a gravure coating method and a roll coating method may be used.

The conductive circuit layer 24 is formed using the above-described ink having conductivity and stretchability. As a method of forming the conductive circuit layer 24, a common printing method such as a gravure printing method, a screen printing method, and an offset printing method and a coating method such as a gravure coating method and a roll coating method may be used.

The adhesive layer 25 is formed to adhere the above layers onto the preform 11. As the adhesive layer 25, a heat-sensitive or pressure-sensitive resin suitable for a material of the preform may be appropriately selected and used. For example, an acrylic resin, a polystyrene resin, a polyamide resin, a polyester resin, a chlorinated polyolefin resin, a chlorinated ethylene-vinyl acetate copolymer resin, a vinyl chloride-vinyl acetate copolymer resin, a cyclorubber, and a coumarone indene resin may be exemplified. As a method of forming the adhesive layer 25, a common printing method such as a gravure printing method, a screen printing method, and an offset printing method and a coating method such as a gravure coating method and a roll coating method may be used.

Here, a drying temperature when the above layers are formed can be set to 50° C. to 200° C.

The above transfer sheet 2 is disposed on the preform 11 (refer to FIG. 3). While a heated roller 3 and the preform 11 rotate in opposite directions, the transfer sheet 2 is pressed against the preform 11 by the roller 3. The temperature during transfer may be set to 100° C. to 250° C., and the pressure during transfer may be set to 0.1 MPa to 20 MPa. Due to the heat and pressure at this time, the transfer layer 20 of the transfer sheet 2 can be transferred onto a circumference of the preform 11. After the transfer, the substrate sheet 21 is removed and the preform having a conductive circuit 1 can be obtained. Here, while the transfer method using the roller 3 is shown in the present embodiment, the present invention is not limited thereto. For example, a flat plate may be used in place of the roller. In this case, while the transfer sheet 2 is pressed against the preform 11 by a heated flat plate, the preform 11 is rotated and moved in either a left or right direction in the drawing. Due to the heat and pressure at this time, the transfer layer 20 can be transferred onto the preform 11.

Figure 5:
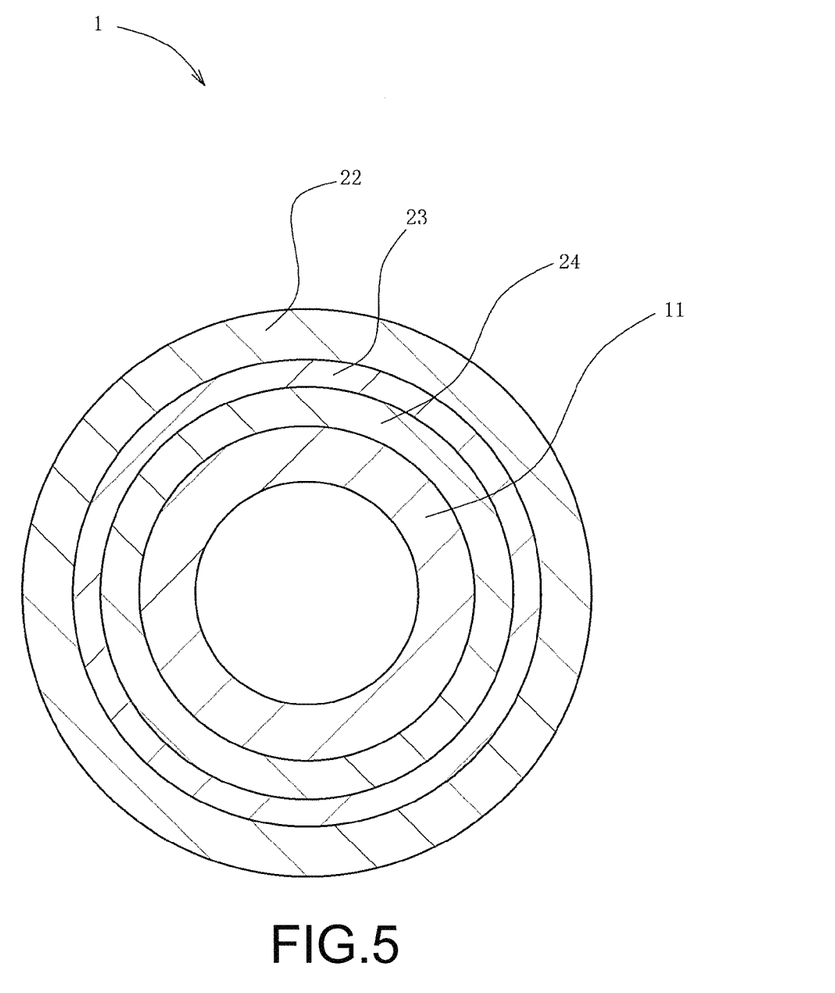
FIG. 5 is a cross-sectional view of a preform having a conductive circuit according to an embodiment of the present invention.

The process of forming the conductive circuit layer 24 on the preform using an ink having conductivity and stretchability can include the following processes (refer to FIG. 5).

(1) A process of forming the conductive circuit layer 24 on the preform 11 using the above-described ink, (2) A process of forming the pattern layer 23 on the conductive circuit layer 24, and (3) A process of forming the protective layer 22 on the pattern layer 23.

Here, in order to increase adhesiveness between the preform 11 and the conductive circuit layer 24, a surface treatment may be performed on the preform 11. Examples of such a surface treatment method include a gas flame method and a corona discharge treatment. The layers on the preform 11 can be formed using a material or method described in the transfer method.

When the layers including the conductive circuit layer 24 are transferred or printed to the preform 11, it is possible to easily provide the conductive circuit layer 24 on the preform 11.

The method of producing a molded article having a conductive circuit of the present invention can further include a process of installing an electronic component on the preform 11 to be electrically connected to the conductive circuit layer 24. As the electronic component, for example, an IC chip may be exemplified. In this case, an antenna 13 patterned into a shape to be electrically connected to an IC chip 12 is formed on the preform 11 according to a printing method using the above-described ink (refer to FIG. 6). The antenna 13 is a portion in which a current generated when a magnetic flux generated from a reader and a writer passes through the antenna 13 flows. The current is supplied from the antenna 13 to the IC chip 12 and the IC chip 12 is activated, and information can be exchanged between the IC chip and the reader and the writer. Next, the antenna 13 and a circuit of the IC chip 12 are electrically conductively connected by a conductive adhesive or the like. A pattern layer and a protective layer are sequentially formed to obtain the preform having a conductive circuit 1. By blow molding the preform having a conductive circuit 1, the molded article having a conductive circuit 7 can be obtained.

Figure 6:
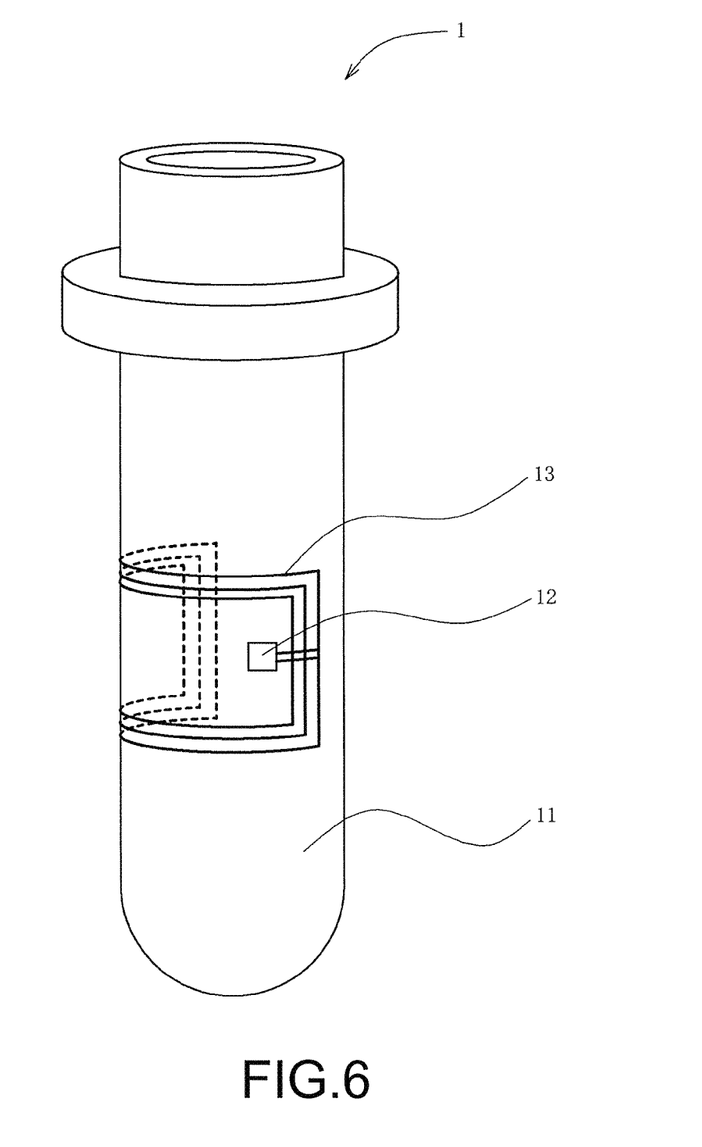
FIG. 6 is a perspective view of a preform on which an electronic component is installed.

Here, when the layers including the conductive circuit layer 24 are formed on the preform 11 through printing, if the heat resistant IC chip 12 is selected, and thicknesses and materials of the pattern layer 23 and the protective layer 22 are appropriately selected, it is possible to protect the IC chip 12 from heat generated when the layers are dried.

Figure 7:
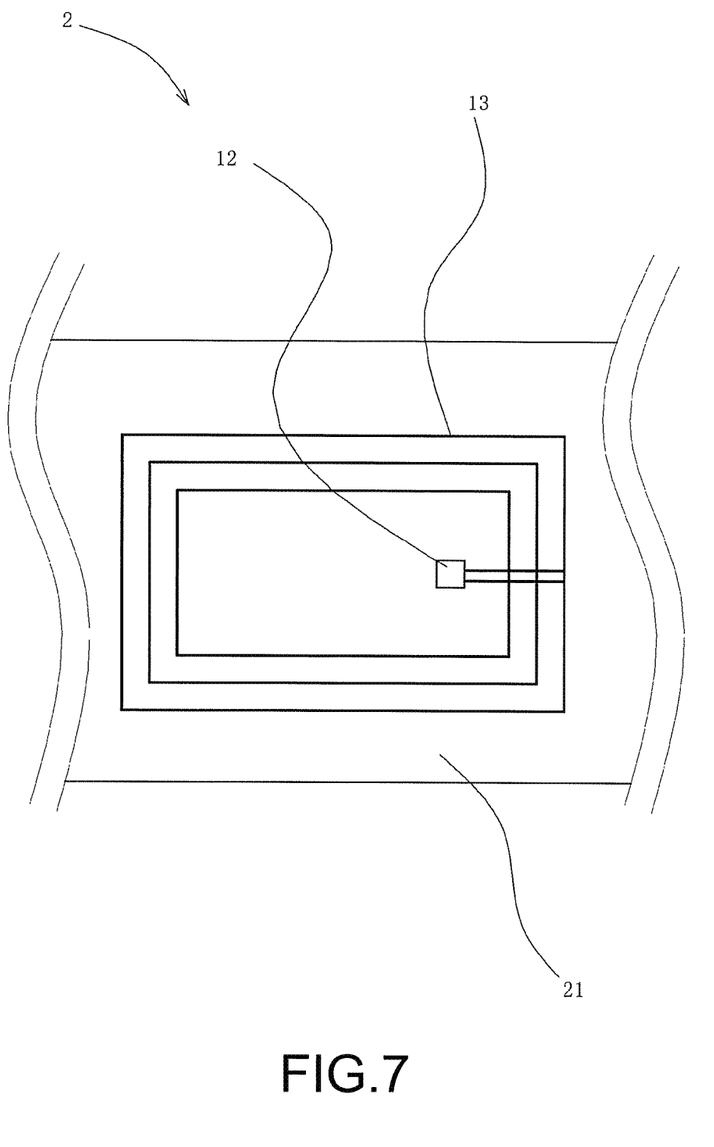
FIG. 7 is a plan view of a transfer sheet on which an electronic component is installed.

An electronic component can be also installed when the layers including the conductive circuit layer 24 are transferred onto the preform 11 (refer to FIG. 7). In this case, a protective layer and a pattern layer are formed on the substrate sheet 21, and additionally, the antenna 13 (conductive circuit layer) patterned into a shape to be electrically connected to the IC chip 12 is printed using the above-described ink. Next, the antenna 13 and a circuit of the IC chip 12 are electrically conductively connected by a conductive adhesive to obtain the transfer sheet 2. The adhesive layer 25 may be formed on the obtained transfer sheet 2 or may be formed on the preform 11. When the transfer sheet 2 is transferred to the preform 11 and the preform having a conductive circuit 1 is blow-molded, the molded article having a conductive circuit can be obtained. In addition, when the IC chip 12 is installed on the preform 11 and the transfer sheet 2 shown in FIG. 4 is transferred to the preform 11, the preform having a conductive circuit 1 can be obtained. In this method, a conductive adhesive may be applied onto the adhesive layer 25 in contact with the circuit of the IC chip 12. In this manner, a conductive adhesive is fused due to heat and pressure during transfer and the circuit of the IC chip 12 and the antenna 13 can be electrically conductively connected.

Here, when the IC chip 12 having heat resistance and durability is selected and thicknesses and materials of the substrate sheet 21 and the layers of the transfer layer 20 are appropriately selected, it is possible to protect the IC chip 12 from heat and pressure during transfer.

The method of producing a molded article having a conductive circuit of the present invention can further include a process of installing an electronic component on a molded article having a conductive circuit to be electrically connected to the conductive circuit layer 24. As the electronic component, for example, an IC chip may be exemplified. In this case, the conductive circuit layer 24 is formed as the coiled antenna 13 as shown in FIG. 6 or FIG. 7. When neither the protective layer 22 nor the pattern layer 23 is formed in the molded article having a conductive circuit 7, for example, if the IC chip 12 is installed through a conductive adhesive applied onto the antenna 13, the antenna 13 and the IC chip 12 can be electrically conductively connected. When the protective layer 22 and the pattern layer 23 are formed in the molded article having a conductive circuit 7, for example, the antenna 13 and the IC chip 12 can be electrically conductively connected by the following method, including (1) providing a hole penetrating the protective layer 22 and the pattern layer 23 to reach the antenna 13, (2) filling the hole with a conductive paste, and (3) installing the IC chip 12 using a conductive adhesive applied onto the conductive paste.

Here, as the electronic component, a display module, a touch panel, a solar cell, and various sensors (a gas sensor, a thermal sensor, and a pressure sensor) can be used in addition to the IC chip.

As described above, it is possible to obtain the molded article having a conductive circuit and the preform having a conductive circuit of the present invention.

REFERENCE SIGNS LIST

1 Preform having conductive circuit
11 Preform
12 IC chip
13 Antenna
2 Transfer sheet
20 Transfer layer
21 Substrate sheet
22 Protective layer
23 Pattern layer
24 Conductive circuit layer
25 Adhesive layer
3 Roller
4 Heater
5 Mold
6 Stretching rod
7 Molded article having conductive circuit

What is claimed is:

1. A method of producing a molded article having a conductive circuit comprising:
    a process of forming the conductive circuit layer on a preform using an ink having stretchability;
    blow molding the preform to obtain the molded article having the conductive circuit; and
    a process of installing an electronic component on the preform or on the molded article having a conductive circuit to be electrically connected to the conductive circuit layer.

2. The method of producing a molded article having a conductive circuit according to claim 1, wherein the process of forming the conductive circuit layer on the preform includes:
    a process of forming a transfer layer including the conductive circuit layer formed on a substrate sheet using the ink to obtain a transfer sheet; and
    a process of disposing the transfer sheet on the preform, applying heat and pressure to the transfer sheet in order to transfer the transfer layer to the preform, and removing the substrate sheet.

3. The method of producing a molded article having a conductive circuit according to claim 2, further comprising:
    a process of forming a pattern layer between the substrate sheet and the conductive circuit layer.

4. The method of producing a molded article having a conductive circuit according to claim 3, further comprising:
    a process of forming a protective layer between the substrate sheet and the pattern layer.

5. The method of producing a molded article having a conductive circuit according to claim 1, wherein the process of forming the conductive circuit layer on the preform includes:
    a process of printing the conductive circuit layer onto the preform using the ink.

6. The method of producing a molded article having a conductive circuit according to claim 5, further comprising:
    a process of forming a pattern layer on the conductive circuit layer.

7. The method of producing a molded article having a conductive circuit according to claim 6, further comprising:
a process of forming a protective layer on the pattern layer.

8. The method of producing a molded article having a conductive circuit according to claim 1, wherein the conductive circuit layer is formed in a part in which an extension rate of the preform is 40% or less.

9. The method of producing a molded article having a conductive circuit according to claim 1, wherein the ink contains any one of silver, PEDOT, carbon black, and a carbon nanotube.

\* \* \* \* \*